US006466733B1

(12) United States Patent
Kim (10) Patent No.: US 6,466,733 B1
(45) Date of Patent: Oct. 15, 2002

(54) DIGITAL RECORDING/PLAYBACK APPARATUS WITH IMPROVED ERROR CORRECTION CAPABILITY OF OUTER ERROR CORRECTION CODING AND METHOD THEREFOR

(75) Inventor: Tae-eung Kim, Yongin (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/069,972

(22) Filed: Apr. 30, 1998

(30) Foreign Application Priority Data

Apr. 30, 1997 (KR) .............................. 97-16817

(51) Int. Cl.[7] ................................. H04N 5/91
(52) U.S. Cl. ........................ 386/68; 386/81; 386/124
(58) Field of Search ............................ 386/116, 124, 386/68, 81, 82, 6–8, 33, 40, 112, 111

(56) References Cited

U.S. PATENT DOCUMENTS

| 4,931,879 A | * | 6/1990 | Koga et al. ................. 386/111 |
| 5,499,144 A | * | 3/1996 | Inoue et al. .................. 386/78 |
| 5,506,688 A | * | 4/1996 | Narita et al. ................. 386/21 |
| 5,596,581 A | | 1/1997 | Saeijs et al. ................. 370/394 |
| 5,784,518 A | * | 7/1998 | Ogura ........................ 386/68 |
| 5,856,890 A | * | 1/1999 | Hamai et al. ................ 360/53 |
| 5,978,542 A | * | 11/1999 | Ting et al. .................... 386/68 |
| 6,018,611 A | * | 1/2000 | Nogami et al. ............... 386/52 |
| 6,028,726 A | * | 2/2000 | Yanagihara .................. 386/81 |
| 6,097,877 A | * | 8/2000 | Katayama et al. ............. 386/68 |
| 6,134,382 A | * | 10/2000 | Mishima et al. .............. 386/68 |
| 6,157,740 A | * | 12/2000 | Buerkle et al. .............. 382/223 |

FOREIGN PATENT DOCUMENTS

| EP | 0 712 247 A2 | 5/1996 | .......... H04N/5/926 |
| GB | 2 288 510 A | 10/1995 | .......... H04N/5/926 |
| GB | 2 288 942 A | 11/1995 | .......... H04N/5/926 |
| GB | 0746156 A2 * | 4/1996 | .......... H04N/5/926 |
| GB | 2 295 066 A | 5/1996 | .......... H04N/5/783 |
| JP | 9-70016 | 3/1997 | ............ H04N/5/92 |
| WO | 95/28706 | 10/1995 | ........... G11B/15/46 |
| WO | 96/13121 | 5/1996 | ............ H04N/5/76 |

OTHER PUBLICATIONS

R.W.J. J. Saeijs et al., "An Experimental Digital Consumer Recorder for MPEG–Coded Video Signals", vol. 41, No. 3.

* cited by examiner

Primary Examiner—Andrew Christensen
Assistant Examiner—Polin Chieu
(74) Attorney, Agent, or Firm—Sughrue Mion, PLLC (57) ABSTRACT

A digital recording/playback apparatus with improved error correction capability and a method thereof are provided. In the apparatus and method thereof, regardless of trick play data and stuffing data, normal play data is outer-error-corrected. To enhance the error correction capability of the normal play data, during a recording mode, a predetermined pattern data is arranged in the stuffing data region and trick play data region and an outer parity is added to the normal play data to then be outer-error-correction coded. During a playback mode, the predetermined pattern data used during error-correction coding is arranged in the stuffing data region and trick play data region and inner-error-correction decoded normal play data is outer-error-correction decoded using the outer parity.

23 Claims, 6 Drawing Sheets

DIGITAL RECORDING/PLAYBACK APPARATUS WITH IMPROVED ERROR CORRECTION CAPABILITY OF OUTER ERROR CORRECTION CODING AND METHOD THEREFOR

BACKGROUND OF THE INVENTION

1. Field of the Invention

The present invention relates to digital recording/playback, and more particularly, to error correction of a digital recording/playback apparatus for recording/playing MPEG-2 (Moving Picture Experts Group) signals.

2. Description of the Related Art

A digital video apparatus can be applied to various fields such as communications, including teleconferencing and video phones, computers, or household electronic appliances. For example, a digital recording/playback apparatus such as a digital video cassette recorder (to be referred to as a D-VCR hereinafter) or a digital video cassette (DVC: to be also called a camcorder) adopts the MPEG-2 standard for digital storage media.

According to the MPEG-2 standard, a program stream consists of the respective elementary streams for video, audio and user data, and is packetized into a packetized elementary stream (PES).

Generally, a picture transmitted from a broadcast station consists of a PES, and one PES is transmitted in units of a predetermined number of transport packets. Additionally, data on a transmission path is in a system layer structure based on the MPEG-2 standard. The system layer structure has a packet structure in units of 188 bytes. In each packet, a 4-byte header is divided into 1-byte sync and 3-byte side information. The number of bytes of the header can vary. The region of the packet, excluding the header, contains video data, audio data or user data.

When recording MPEG-2 bit streams, a digital recording/playback apparatus extracts trick play data from the MPEG-2 bit streams as well as normal play data to satisfy both a normal-play (NP) mode and a trick-play (TP) mode, and records the extracted trick play data on a separate trick play data region.

Also, a digital recording/playback apparatus can record an ATV (Advanced Television) signal which is an American type of HDTV (High Definition Television) signal, or a DVB (Digital Video Broadcasting) signal which is an European type of HDTV signal, both of which adopt MPEG-2 compression. The digital recording/playback apparatus records the signal in a 25, 12.5 or 6.25 Mbps recording mode according to the bit rate of a transmitted signal. If there is a difference between the bit rate of a recording mode and that of the transmitted signal, a stuffing region is allocated to a predetermined region of the normal play data region, thereby recording stuffing data, i.e., dummy data. In performing error correction coding and decoding in consideration of the stuffing data, the capability of correcting errors of normal play data is affected by the quantity of the stuffing data. The present invention has been proposed to improve the capability of correcting errors of normal play data, without being affected by the stuffing data which is the dummy data.

Also, when the video bit stream of an MPEG-2 format is recorded by the digital recording/playback apparatus, an ECC (Error Correction Code) structure of a track format is for recording inter-picture coded bit streams. Thus, the inter-picture coded bit streams such as the ATV or DVB signal are susceptible to error.

To solve the problem, a predetermined region of the normal play data region is allocated, called an ECC3 region, for storing outer parity for correcting errors of only the normal play data.

However, in performing error correction coding using the additionally provided ECC3 region, the normal play data of the ECC structure is written in units of a predetermined number (10 typically) tracks and the outer parity is added to the ECC3 region to allow interleaving to correct burst errors. This requires a large capacity memory. In practice, decoding the ECC3 requires complicated hardware.

SUMMARY OF THE INVENTION

To solve the above problems, it is a first objective of the present invention to provide a digital recording/playback apparatus for performing outer error correction coding by arranging a predetermined pattern data in a stuffing region and a trick play data region for an ECC block containing the stuffing region, during a recording mode, and performing outer error correction decoding by arranging the pattern data used in the coding is in the stuffing region and the trick play data region, during a playback mode.

It is a second objective of the present invention to provide a digital recording/playback apparatus for performing outer error correction coding by arranging a predetermined pattern data in an ECC3 region additionally provided in the normal play data region, during a recording mode, and performing outer error correction decoding by arranging the pattern data used in the coding in the ECC3 region, during a playback mode.

It is a third objective of the present invention to provide a digital recording/playback method for performing outer error correction coding by arranging a predetermined pattern data in a stuffing region and a trick play data region for an ECC block containing the stuffing region, during a recording mode, and performing outer error correction decoding by arranging the pattern data used in the coding in the stuffing region and the trick play data region, during a playback mode.

It is a fourth objective of the present invention to provide a digital recording/playback method for performing outer error correction coding by arranging a predetermined pattern data in an ECC3 region additionally provided in the normal play data region, during a recording mode, and performing outer error correction decoding by arranging the pattern data used in the coding in the ECC3 region, during a playback mode.

Accordingly, to achieve the first objective, there is provided a digital recording/playback apparatus for recording normal play data and trick play data separately on a recording medium in a predetermined data format, and reproducing the data recorded on the recording medium, the apparatus comprising: an adding unit for adding extra information indicative of a decoding timing to a received transport stream and outputting the normal play data in units of a predetermined number of sync blocks; an extracting unit for extracting the trick play data from the received transport stream and outputting the trick play data in units of a predetermined number of sync blocks; an arranging unit for arranging the normal play data in a normal play data region, the trick play data in a trick play data region, and predetermined pattern stuffing data in a stuffing region of the normal play data region according to a difference between a predetermined recording rate and a bit rate of the transport stream; an error correction coder for performing outer error correction on the normal play data, regardless of the trick play data and stuffing data among the arranged data, and outputting error-correction-coded data; and a modulator for modulating the error-correction-coded data and transmitting modulated data to the recording medium.

Here, the error correction coder comprises: an outer error correction coder for arranging a predetermined pattern data in the stuffing region and the trick play data region, adding an outer parity to the normal play data, and outputting outer-error-correction-coded data; and an inner error correction coder for adding an inner parity to the outer-error-correction-coded data output from the outer error correction coder, and outputting inner-error-correction-coded data.

Also, the digital recording/playback apparatus further comprises: a demodulator for demodulating the data recorded on the recording medium and outputting demodulated data; an error correction decoder for performing error-correction-decoding on the demodulated data; and a selector for selecting error-correction decoded normal play data during a normal play mode, and selecting error-correction decoded trick play data during a trick play mode, according to a normal/trick play mode signal, wherein the error correction decoder comprises: an inner error correction decoder for performing inner error correction decoding on the demodulated normal play data using the inner parity during a normal play mode and outputting inner-error-correction-decoded normal play data to the selector, and for performing inner error correction decoding on the demodulated trick play data using the inner parity during a trick play mode and outputting inner-error-correction-decoded trick play data to the selector; and an outer error correction decoder for arranging the predetermined pattern data used in the error correction coding in the stuffing region and the trick play data region, performing outer error correction decoding on the inner-error-correction-decoded normal play data using the outer parity, and outputting outer-error-correction-decoded data.

To achieve the second objective, there is provided a digital recording/playback apparatus wherein an outer error correction coder performs outer error correction coding by overwriting the predetermined pattern data in a separate error correction code region of the normal play data region, and an outer error correction decoder performs outer error correction decoding by overwriting the predetermined pattern data in a separate error correction code region of the normal play data region.

To achieve the third objective, there is provided a method for recording normal play data and trick play data separately on a recording medium in a predetermined data format, and reproducing the data recorded on the recording medium, comprising the steps of: (a) adding extra information indicative of a decoding timing to a received transport stream and outputting a transport packet to which the extra information is added; (b) mapping a first predetermined number of transport packets, to which the extra information is added, in units of a second predetermined number of sync blocks and outputting the normal play data; (c) extracting trick play data from the received transport stream; (d) packetizing extracted trick play data, mapping the first predetermined number of transport packets of packetized trick play data in units of the second predetermined number of sync blocks and outputting the trick play data; (e) arranging the normal play data in a normal play data region, the trick play data in a trick play data region, and predetermined pattern stuffing data in a stuffing region of the normal play data region according to a difference between a predetermined recording rate and a bit rate of the transport stream; (f) performing outer error correction on the normal play data, regardless of the trick play data and stuffing data among the arranged data, and outputting error-correction-coded data; and (g) modulating the error-correction-coded data and transmitting modulated data to the recording medium.

Here, the step (f) comprises the steps of: (f1) arranging a predetermined pattern data in the stuffing region and the trick play data region, adding an outer parity to the normal play data, and outputting outer-error-correction-coded data; and (f2) adding an inner parity to the outer-error-correction-coded data, and outputting inner-error-correction-coded data.

Also, the method further comprises the steps of: (h) demodulating the data recorded on the recording medium and outputting demodulated data; (i) performing error-correction-decoding on the demodulated data; and (j) selecting error-correction decoded normal play data during a normal play mode, and selecting error-correction decoded trick play data during a trick play mode, according to a normal/trick play mode signal, wherein the step (i) comprises the steps of:

(i1) performing inner error correction decoding on the demodulated normal play data using the inner parity during a normal play mode and outputting inner-error-correction-decoded normal play data, and performing inner error correction decoding on the demodulated trick play data using the inner parity during a trick play mode and outputting inner-error-correction-decoded trick play data; and (i2) arranging the predetermined pattern data used in the error correction coding in the stuffing region and the trick play data region, performing outer error correction decoding on the inner-error-correction-decoded normal play data using the outer parity, and outputting outer-error-correction-decoded data.

To achieve the fourth objective, according to the present invention, in the step (i2), outer error correction decoding is performed by overwriting the predetermined pattern data used during the error correction coding in a separate error correction code region of the normal play data region.

BRIEF DESCRIPTION OF THE DRAWINGS

The above objectives and advantages of the present invention will become more apparent by describing in detail a preferred embodiment thereof with reference to the attached drawings in which.

DESCRIPTION OF THE PREFERRED EMBODIMENT

A preferred embodiment of a digital recording/playback apparatus and method according to the present invention will now be described with reference to the accompanying drawings.

Figure 1:
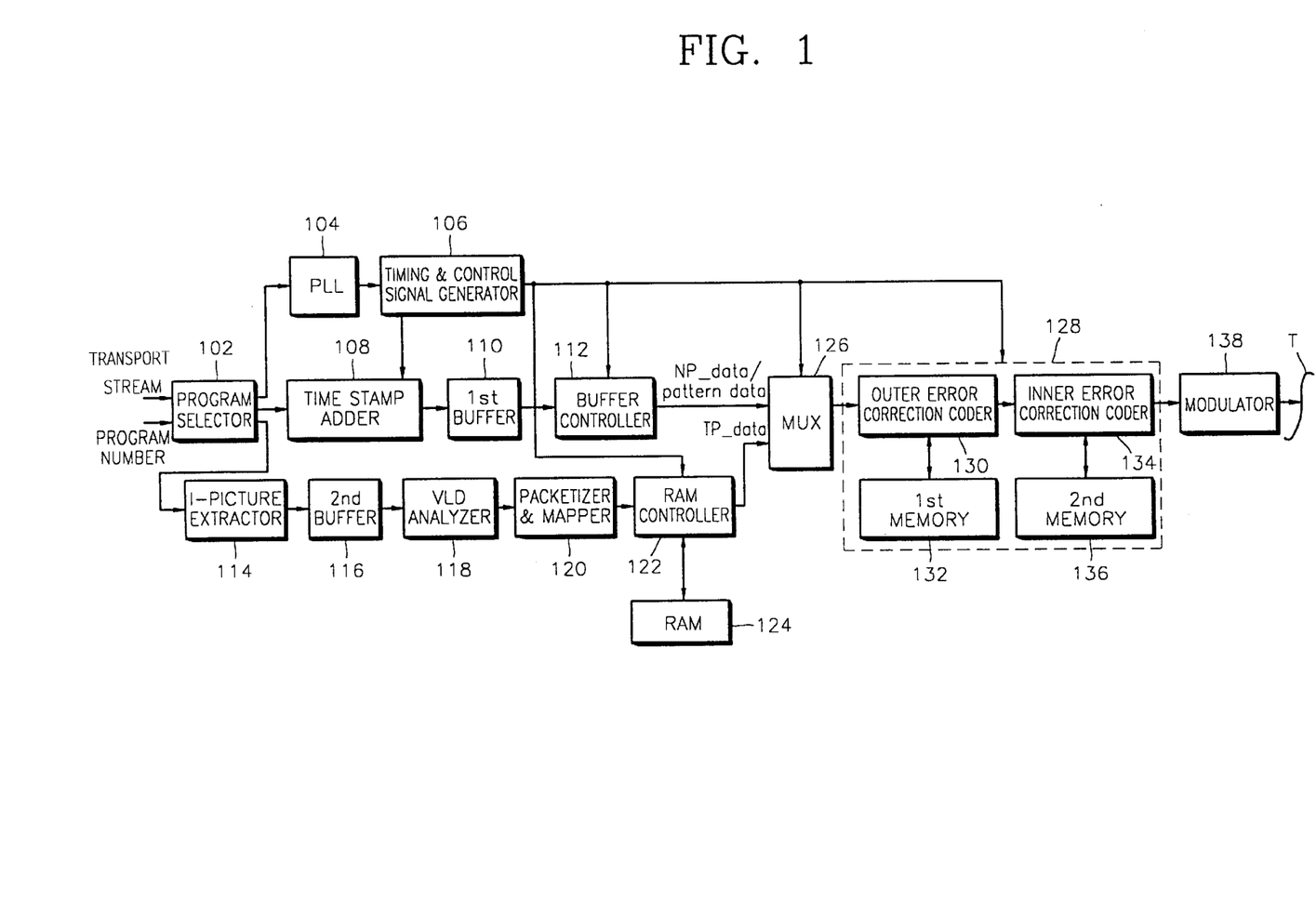
FIG. 1 is a block diagram of a coder for a digital video cassette recorder according to an embodiment of the present invention.

In FIG.1, a program selector 102 selects a transport stream of a program corresponding to the program number input by a user from an MPEG-2 transport stream, outputs the transport stream of the selected program to a time stamp adder 108, outputs a PCR (Program Clock Reference) extracted from the transport stream to a PLL (Phase Locked Loop) circuit 104, and outputs a video layer extracted from the transport stream to an I (Intra)-picture extractor 114. The PLL circuit 104 generates a 27 MHZ clock signal synchronized with a 27 MHZ clock signal used during the transmission, based on the PCR output from the program selector 102.

Here, the video image is digitized and made into a bit stream in an MPEG-2 structure to be transmitted as compressed data. The bit stream is constructed of a video layer structure and a transport layer structure. A signal subjected to MPEG-2 compression is added to the video layer structure, and a header for transmission is added to the transport layer, so that the data is transmitted in units of transport packets.

A timing & control signal generator 106 up-counts the 27 MHZ clock signal generated in the PLL circuit 104, applies the counted value to the time stamp adder 108, applies a track signal indicative of a track on a tape to a buffer controller 112 and a RAM controller 122, applies a region control signal indicative of whether the pertinent region is a normal play data region, stuffing region, ECC3 region or trick play data region, to a multiplexer (MUX) 126, and applies an ECC block signal indicative of an ECC block to an error correction coder 128.

The time stamp adder 108 adds a time stamp indicative of the time for the transport stream to arrive in the coder, to each transport packet output from the program selector 102, in order to restore the transport stream in the same time interval in the decoder of the digital VCR.

A first buffer 110 temporarily stores the normal play data with the time stamp added thereto, output from the time stamp adder 108. The buffer controller 112 includes a 2-to-5 mapper for separating a 1-byte sync from the normal play data (NP_data) of the 188 byte transport packet, temporarily stored in the first buffer 110, collecting two 187-byte packets and mapping the same into five sync blocks.

The buffer controller 112 reads the normal play data in units of 5 sync blocks according to a track signal generated in the timing & control signal generator 106 to correspond with the normal play data region of the ECC block, and generates predetermined pattern data (pattern data) for the stuffing data region and ECC3 region of the normal play data region. The stuffing data region is preferably constructed in units of 5 sync blocks. 10 sync blocks are allocated to the ECC3 region.

As described above, recording is performed at rates of 25, 12.5 or 6.25 Mbps recording mode according to the bit, rate of the ATV or DVB signal recorded in the digital VCR. If the bit rate of an input source bit stream, i.e., an input MPEG-2 bit stream, is 13 Mbps, the bit stream must be recorded and reproduced in the 25 Mbps recording mode. The stuffing data of a predetermined pattern is stuffed in the portion having a difference between the bit rate of the transmitted signal and that of the recording mode. The greater the difference, the more stuffing data is stuffed therein.

Here, the data of a predetermined pattern is in units of bytes, the stuffing data of a predetermined pattern is an 8-bit binary value, and can be set from "00000000" to "11111111". Preferably, an arithmetic zero pattern is used. Since the arithmetic zero pattern is easy to generate, a read-only memory (ROM) is not necessary for storage of data patterns. Moreover, since additions may be omitted from calculations concerning the arithmetic zero, the arithmetic zero pattern simplifies the calculation for outer error correction, like in the coding process and the decoding process for reproducing the recorded video signal.

Figure 2:
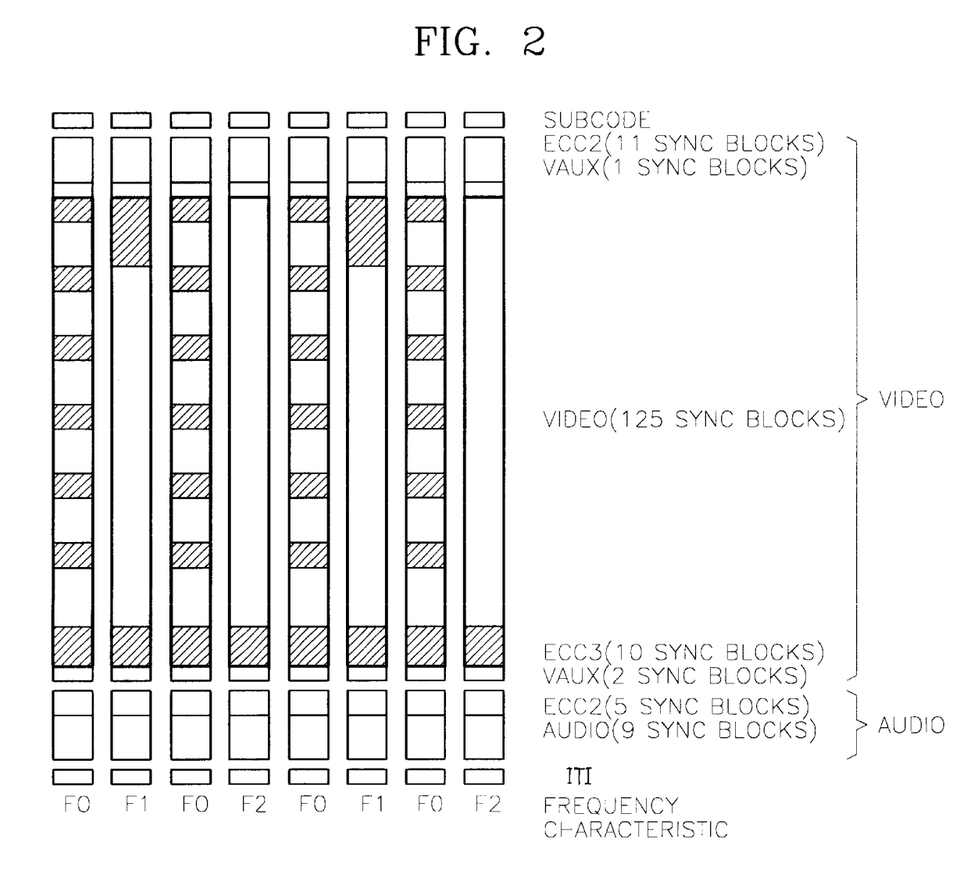
FIG. 2 is an example of a track format of a signal supplied for recording on a digital video tape.

FIG. 2 is an example of a track format of an ATV or DVB signal supplied for recording on a digital video tape. As shown in FIG. 2, the format of the signal read from a head of the D-VCR is constructed such that each track consists of an ITI (Insert and Track Information) sector, an audio sector, a video sector and a subcode sector, sequentially arranged from the track start part at which the head starts scanning.

Also, during the playback mode of the D-VCR, if the head deviates from the track of a magnetic tape, the outputs of the head decrease and the errors increase, which makes it difficult to achieve normal play of the D-VCR. Thus, different pilot signals are recorded on consecutive tracks, e.g., in a F0-F1-F0-F2 pattern sequence, and the crosstalk of the pilot signals of the preceding and following tracks of a track that the head traces most closely are compared. Then, it is detected how the head tracking deviates from the pertinent track relative to the preceding track or the following track, so that the head can trace a target track exactly. In the video region of the video sector, every second track contains six trick play data regions, in which high speed trick play data are recorded, and every fourth track contains one trick play data region in which low speed trick play data are recorded. In FIG. 2, the trick play data regions are shaded. In the remaining video region, the normal play data or stuffing data is recorded. The high and low speed trick play data regions may be differently arranged according to a multiple times speed mode, and are allocated in units of 5 sync blocks or a multiple thereof.

Figure 3:
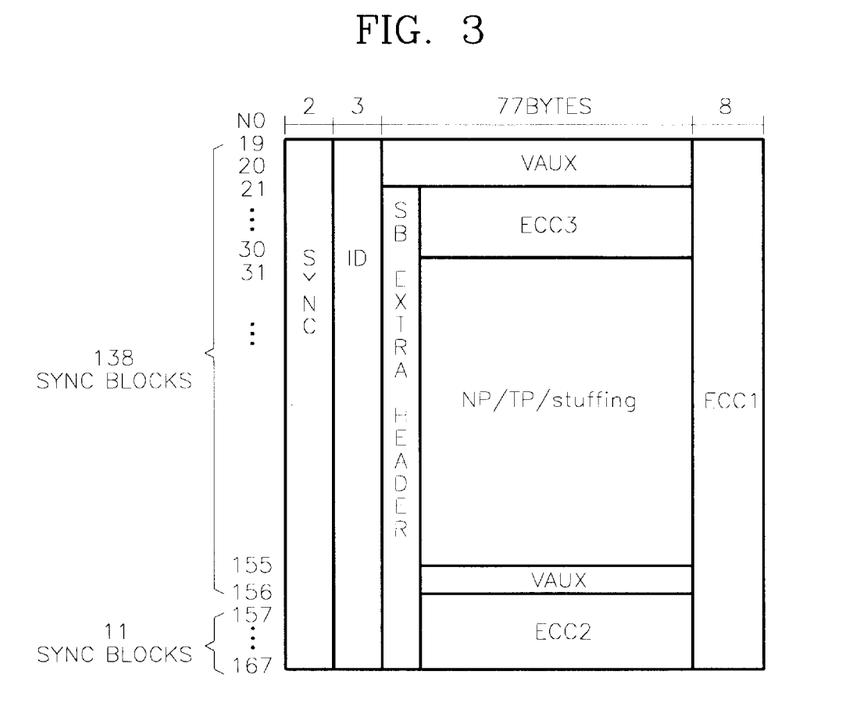
FIG. 3 shows a format of an ECC block recorded on a video sector shown in FIG. 2.

The video sector of the track format shown in FIG. 2 has an ECC structure, as shown in FIG. 3. In FIG. 3, the video sector consists of sync blocks 19 and 20 as a first video auxiliary region (VAUX), sync blocks 21–155 as a video data region, sync block 156 as a second video auxiliary data region, and sync blocks 157–167 as an outer parity region. Each sync block has a 2-byte sync code, a 3-byte ID, 77 bytes of data and an 8-byte inner parity for inner error correction. An ECC2 region is a region to which outer codes are added for storage of outer parity information in an ECC structure, and an ECC1 region is a region to which inner codes are added for storage of inner parity information in the ECC structure.

Video auxiliary data such as a program number input by a user and supplied from a servo mechanism system controller (not shown) is written in the first and second video auxiliary data regions.

In the video data region of sync blocks 21–55, there is an ECC3 region (sync blocks 21–30), a normal play data region and a trick play data region, as shown in FIG. 2, the normal play data region containing a stuffing region.

Each of sync blocks (77 bytes) 21–155 of the video data region has a 1-byte sync block extra header (SB_EXTRA_HEADER). The sync block extra header (SB_EXTRA_HEADER) is a header for indicating whether the data of the sync block is the normal play data, trick play data, stuffing data or ECC3 data.

Figure 4:
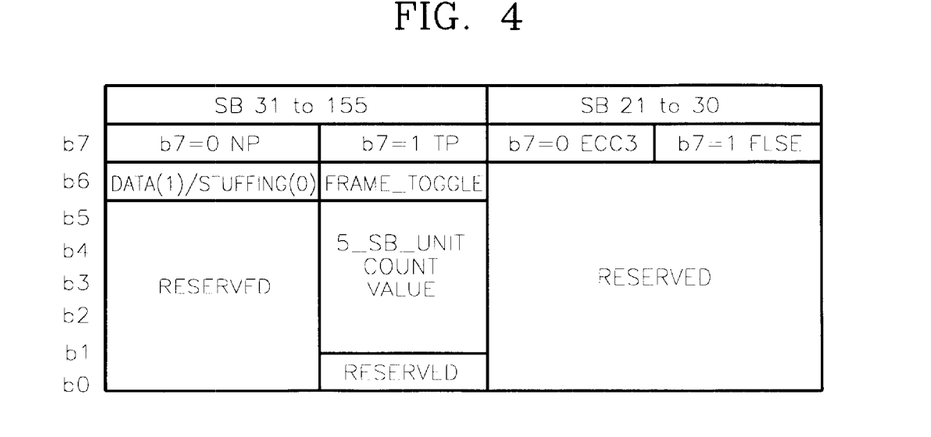
FIG. 4 is a table for explaining a sync block extra header shown in FIG. 3.

A table for explaining the content of the sync block extra header (SB_EXTRA_HEADER) is shown in FIG. 4. In FIG. 4, in the sync block extra header (SB_EXTRA_HEADER) of sync blocks 31–155, if the most significant bit b7 (MSB) is "0" and the second most significant bit b6 is also "0", then the data of sync block is stuffing data. If the MSB b7 is "0" and the second most significant bit b6 is "1", the data of the sync block is normal play data. If the MSB is "1", then the data of the sync block is trick play data, and the second most significant bit is a toggle bit indicative of the pertinent packet of two packets, and the next five lower bits are the sync block ID of the trick play data.

In the sync block extra header (SB_EXTRA_HEADER) of sync blocks 21–30, if the MSB is "0", then the data region of the sync block is an ECC3 region. A predetermined pattern data is written on the ECC3 region according to the present invention.

Figure 5A:
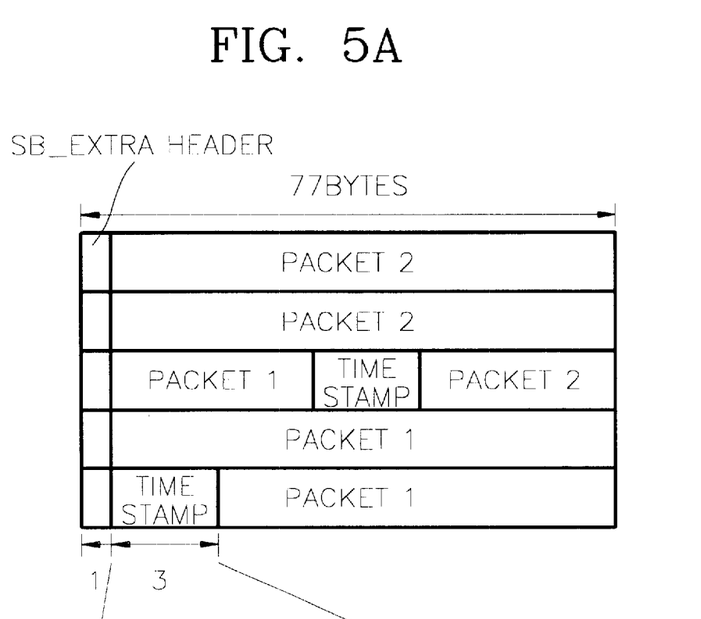
FIGS. 5A and 5B illustrate 2-to-5 mapping performed in a buffer controller shown in FIG. 1, and a time stamp shown in FIG. 5A, respectively.

FIG. 5A illustrates 2-to-5 mapping performed in a buffer controller 112 shown in FIG. 1. The 2-to-5 mapping refers to mapping two transport packets into 5 sync blocks. A 3-byte time stamp indicative of a decoding timing is added to each packet, and a 1-byte sync block extra header is added to each sync block. Here, although a D-VCR or DVC system for recording the DVB or ATV signal generally performs 2-to-5 mapping, a DVHS (Digital Video Home System) may perform 2-to-3 mapping. Thus, the present invention is not limited to the 2-to-5 mapping.

Figure 5B:
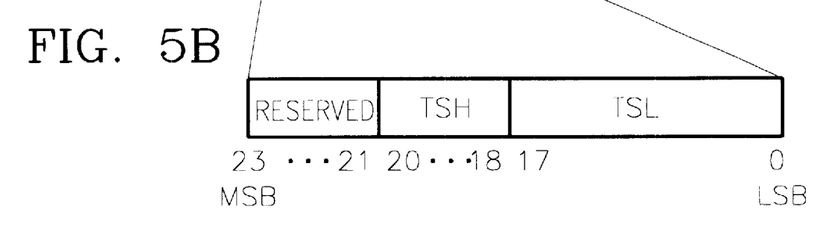

FIG. 5B illustrates the internal structure of a 3-byte time stamp shown in FIG. 5A. The time stamp shown in FIG. 5B has a first time stamp region (TSH) and a second time stamp region (TSL). The second stamp region (TSL), comprised of 18 lower significant bits, stores the counted values counted by the 27 MHZ clock signal within 2 tracks. The first stamp region (TSH), comprised of the next 3 upper bits of the second stamp region (TSL), stores the counted values corresponding to 16 tracks, since the counted values increasing in units of 2 tracks are stored.

Since the D-VCR is operable in a track playback mode, trick play data must be extracted. The MPEG-2 bit stream is subjected to MPEG-2 compression, the quantities of compressed data are different for each picture, thereby disabling trick play implementation by the normal play data. Thus, the I-picture extractor 114 extracts I-picture data from a video layer output from the program selector 102.

The second buffer 116 temporarily stores the extracted I-picture data, a VLD analyzer 118 performs VLD (Variable Length Decoding) on the I-picture data stored in the second buffer 116 and extracts the trick play data having a DC coefficient and a predetermined number of low frequency AC coefficients on a DCT block. The packetizer & mapper 120 packetizes the extracted trick play data in the form of 188-byte transport packet by adding the transport packet header thereto, separates a 1-byte sync from the packetized trick play data, collects two 187-byte packets, maps the same into 5 sync blocks, adds the time stamp to each packet and adds the sync block extra header (SB_EXTRA_HEADER) as shown in FIGS. 3 and 4 to each sync block. Here, the time stamp for trick play data does not contain information indicative of a decoding timing, unlike the time stamp for normal play data.

The RAM controller 122 writes the trick play data (TP_data) output from the packetizer & mapper 120 in units of 5 sync blocks in the RAM 124, and reads the trick play data stored in the RAM 124 to be recorded on the trick play data region of a predetermined track according to a track signal generated in the timing & control signal generator 106. In this case, since the trick play data may be repeatedly written on the trick play data region according to a multiple times speed mode, the RAM 124 is necessary.

According to a region control signal generated in the timing & control signal generator 106, a multiplexer 126 selects the normal play data (NP-data) read from the buffer controller 112 in the normal play data region of the ECC block, selects the predetermined pattern data (pattern data) which is arithmetic zero, output from the buffer controller 112 in the stuffing region and the ECC region, and selects the trick play data of the RAM 124 in a predetermined trick play data region of a track. The trick play data is both high speed trick play data for the high speed data region and low speed trick play data for the low speed data region, shown in FIG. 2.

An error correction coder 128 arranges the normal play data and trick play data selected by the multiplexer 126 according to an ECC block signal generated in the timing & control signal generator 106, and then performs outer and inner error correction coding. Here, at least one ECC block is allocated to each track. In detail, the error correction coder 128 includes an outer error correction coder 130, a first memory 132, an inner error correction coder 134, and a second memory 136.

The error correction coder 128 adds an 11-byte outer parity to a 138-byte outer code in a row direction to then perform outer error correction coding, and then adds an 8-byte inner parity to a 77-byte inner code in a column direction, during a recording mode. The ECC3 region remains as an optional region, without an outer parity for normal play data error correction added thereto. The central concept of the present invention is to enhance the error correcting capability for the normal play data in performing the outer error correction coding, regardless of error correction coding for the stuffing data.

Figure 6:
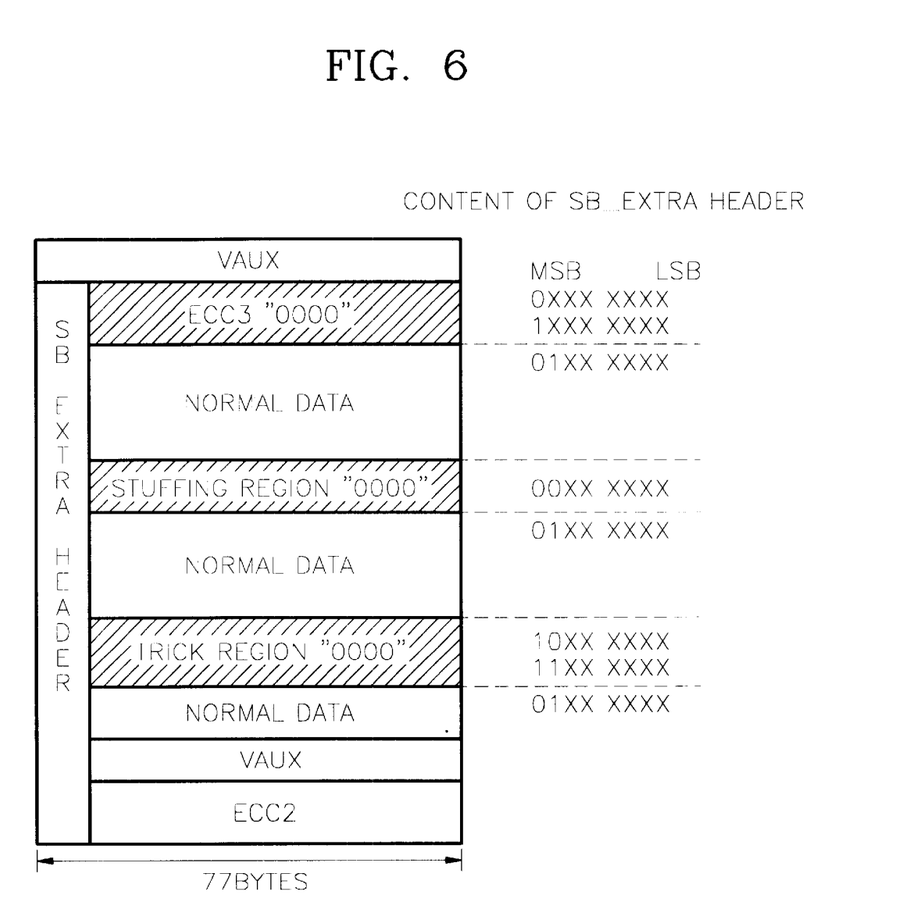
FIG. 6 illustrates outer error correction coding performed in an outer error correction coder shown in FIG. 1.

In other words, as shown in FIG. 6, the outer error correction coder 130 arranges the predetermined pattern data (here, arithmetic zero, i.e., "0000") in the ECC3 region, stuffing region and trick play data region and adds an 11-byte outer parity to 138 bytes in the ECC2 region. Thus, during the outer error correction coding, the data of the ECC3, stuffing and trick play data regions are disregarded, and the outer parity is added to only the normal play data, thereby improving the error correction capability for the normal play data. Here, the first memory 132 has a memory size of at most one field to be used during the outer error correction coding.

The inner error correction coder 134 adds an 8-byte inner parity to each 77-byte sync block of the outer-error-correction-coded data output from the outer error correction coder 130 in the ECC1 region. The second memory 136 has a memory size of at least one sync block to be used during the inner error correction coding.

In addition, the 2-byte sync data and 3-byte ID data shown in FIG. 3 may be added either before the outer error correction coding or after the inner error correction coding.

A modulator 138 performs 24-to-25 modulation on the error-correction-coded data output from the error correction coder 128 in a known manner. Alternatively, interleaving may be performed before modulation, to give protection against burst errors. The specific data modulating scheme used during recording is not relevant in the present invention.

Figure 7:
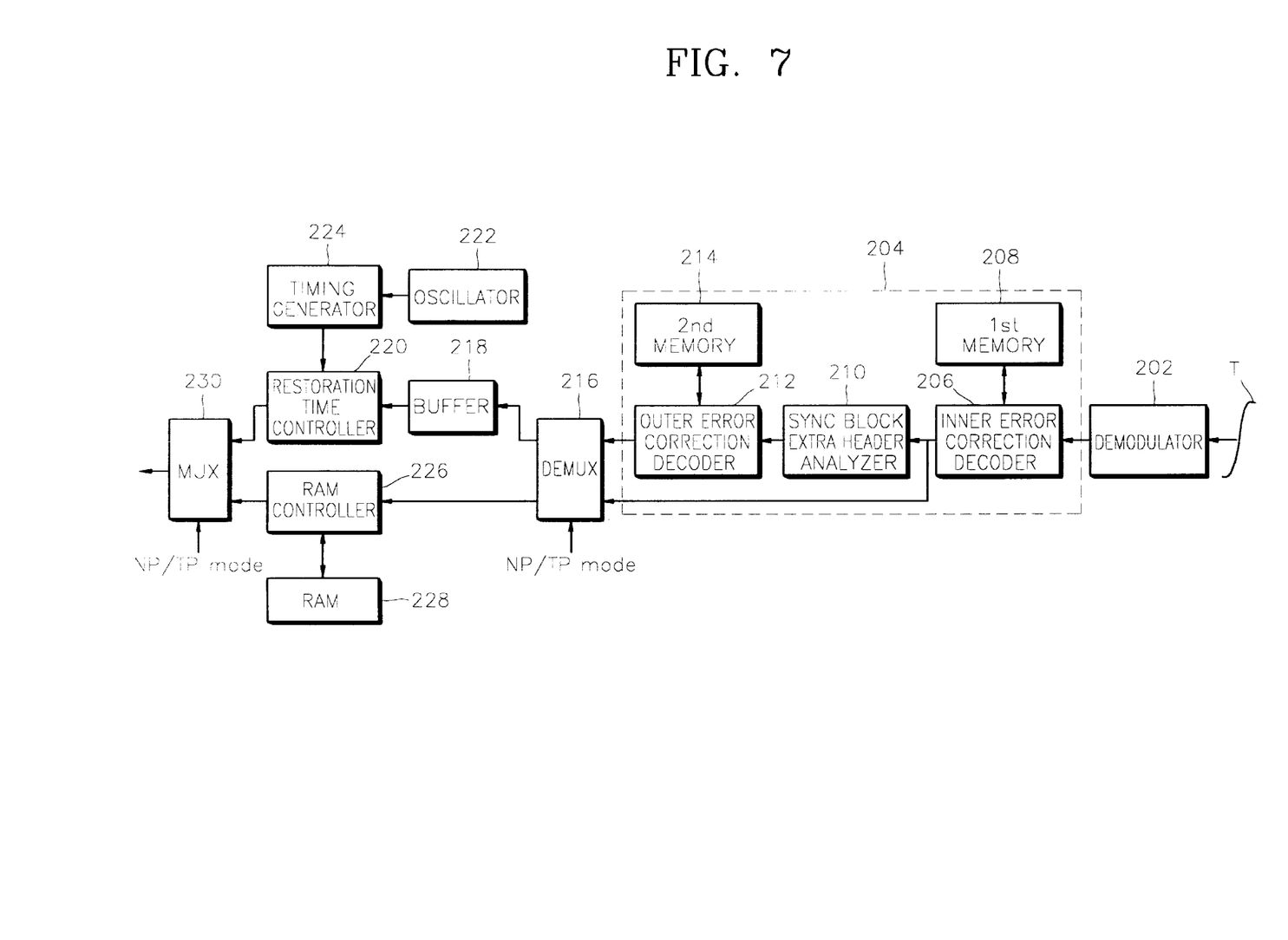
FIG. 7 is a block diagram of a decoder for the digital video cassette recorder according to an embodiment of the present invention.

FIG. 7 shows a decoder for the D-VCR for reproducing the data recorded on a digital video tape.

In FIG. 7, a demodulator 202 demodulates data read from a digital video tape (T) in accordance with the modulating scheme used during recording. Here, a 2-byte sync and a 3-byte ID can be separated from the demodulated normal play data and trick play data. Otherwise, the 230-byte sync and the 3-byte ID can be separated after outer error correction decoding.

An error correction decoder 204 performs inner error correction decoding in a row direction, that is, error correction is performed up to 4 bytes among 85 bytes, and then an error flag is added to uncorrected sync blocks.

Here, during the outer error correction decoding, the uncorrected sync blocks are corrected using the error flag representing the sync blocks to be subjected to error correction, and the error correction is performed in a column direction, up to 11 bytes among 149 bytes. The error correction decoder 204 includes an inner error correction decoder 206, a first memory 208, a sync block extra header analyzer 210, an outer error correction decoder 212 and a second memory 214.

The inner error correction decoder 206 performs inner error correction coding on the normal play data sync block, trick play data sync block, stuffing data sync block, and ECC3 region sync block, using the inner parity. The first memory 208 which is used in the inner error correction decoding has a memory size of at least one sync block.

The sync block extra header analyzer 210 analyzes the sync block extra header added to the inner-error-correction-coded data to determine whether the inner-error-correction-coded data is the data of the normal play data region, trick play data region, stuffing data region or ECC3 region.

If the pertinent data is determined to be in the normal play data region, trick play data region, stuffing data region or ECC3 region according to the sync block extra header, then the outer error correction decoder 212 arranges the predetermined pattern data used in coding, and performs outer error correction decoding. The second memory 214 has a memory size of an ECC block to be used in outer error correction decoding, i.e., at most one track.

During a normal play mode, the outer error correction decoder 212 performs the outer error correction decoding in the following manner. For the 21st through 30th sync blocks, if the MSB of the sync block extra header analyzed in the sync block extra header analyzer 210 is "0"l, the sync blocks are determined to be in the ECC3 region. Thus, the predetermined pattern data (here, arithmetic zero) is overwritten on 76 sync blocks excluding the sync block extra header, in the ECC3 region. For the 31st through 155th sync blocks, if the MSB of the sync block extra header analyzed in the sync block extra header analyzer 210 is "1", the sync blocks are determined to be in the trick play data region. Thus, the predetermined pattern data (here, arithmetic zero) is overwritten on the 76 sync blocks excluding the sync block extra header, in the trick play data region. Otherwise, if both the MSB and the second most significant bit of the sync block extra header analyzed in the sync block extra header analyzer 210 are "0", the sync blocks are determined to be in the stuffing region. Thus, the stuffing data used in the coding (here, arithmetic zero) is overwritten on 76 sync blocks excluding the sync block extra header.

Thus, a probable channel error in the ECC3 region, trick play data region and stuffing region is negligible, thereby improving the error correction capability for the normal play data. The error correction method according to the present invention can greatly improve the error correction capability for the normal play data, as the difference between the recording mode bit rate and the actually recorded bit rate is relatively greater.

A demultiplexer (DEMUX) 216 outputs data to different paths for the normal play data or the trick play data depending on a normal play or trick play mode signal (NP/TP mode).

The normal play data is output to a buffer 218, a restoration time controller 220, an oscillator 222 and a timing generator 224, during a normal play mode. Here, the oscillator 222 and the timing generator 224 may be incorporated into the PLL circuit 104 and the timing & control signal generator 106 respectively, of the coder shown in FIG. 1.

During a normal play mode, the outer-error-correction-decoded normal play data output from the outer error correction decoder 212 through the demultiplexer 216 is read out for each sync block and temporarily stored in the buffer 218 in units of five 77-byte sync blocks. The restoration time controller 220 separates the time stamp from the normal data stored in the buffer 218 to form the separated time stamp into two 187-byte transport packets. Then, a 1-byte packet sync is added to the respective packets to form two 188-byte transport packets, so that the transport packets packetized according to the time stamp, that is, according to the time at which the normal play data was input to the coder, are output through a multiplexer 230.

Here, the timing generator 224 up-counts according to a clock signal of the 27 MHZ frequency generated by the oscillator 222 and outputs the counted value to the restoration time controller 220. In other words, the restoration time controller 220 compares the counted value output from the timing generator 224 with the time stamp for the transport packet of the normal play data, and outputs the compared data according to the comparison result.

Trick play data is output to a RAM controller 226 and a RAM 228. In other words, during a trick play mode, the inner-error-correction-decoded trick play data output from the inner error correction decoder 206 through the demultiplexer (DEMUX) 216 is written to the RAM 228 and then output according to the control of the RAM controller 226. The RAM controller 226 removes overlapping data or non-trick play data among the trick play data scanned when the trick play data region of the tape for a trick play mode is scanned. Also, the RAM controller 226 rearranges sync blocks during a backward search mode and writes the same to the RAM 228. The overlapping data can be generated by repeatedly writing the trick play data to tracks according to a multiple times speed function. Also, the non-trick play multiple times speed data corresponding to the trick play speed selected by a user may be read by the head during the trick play mode.

Also, the RAM controller 226 reads the rearranged inner-error-correction-decoded trick play data from the RAM 228 to form units of two 187-byte transport packets, and adds a 1-byte packet sync to each packet to then output 188-byte transport packets through the multiplexer (MUX) 230.

According to a normal play/trick play mode signal (NP/TP mode), the multiplexer 230 outputs the output of the restoration time controller 220 during a normal play mode, and outputs the output of the RAM controller 226 during a trick play mode.

As described above, according to the present invention, predetermined pattern data is arranged in an ECC3 region, a stuffing region and a trick play data region and then outer-error-correction coded during a recording, and the predetermined pattern data used in coding are rearranged in the respective regions and then outer-error-correction decoded during a playback. Thus, errors generated in the ECC3 region, the stuffing region and the trick play data region are negligible, and only the normal play data is error-corrected, thereby enhancing the error correction capability. Also, the more the stuffing data, the greater the error correction capability.

What is claimed is:

1. A digital recording/playback apparatus for recording normal play data and trick play data separately on a recording medium in a predetermined data format, and reproducing the data recorded on the recording medium, the apparatus comprising:

- an adding unit for adding extra information indicative of a decoding timing to a received transport stream and outputting the normal play data in units of a predetermined number of sync blocks;
- an extracting unit for extracting the trick play data from the received transport stream and outputting the trick play data in units of a predetermined number of sync blocks;
- an arranging unit for arranging the normal play data in a normal play data region, the trick play data in a trick play data region, and a predetermined pattern data in a stuffing region of the normal play data region according to a difference between a predetermined recording rate and a bit rate of the transport stream;
- an error correction coder for performing outer error correction on the normal play data, regardless of the trick play data and stuffing data among the arranged data, and outputting error-correction-coded data; and
- a modulator for modulating the error-correction-coded data and transmitting modulated data to the recording medium,
- wherein the error correction coder comprises:
  - an outer error correction coder for arranging the predetermined pattern data in the stuffing region and the trick play data region simultaneously, adding an outer parity to the normal play data, and outputting outer-error-correction-coded data of normal play data; and
  - an inner error correction coder for adding an inner parity to the outer-error-correction-coded data output from the outer error correction coder, and outputting inner-error-correction-coded data.

2. The digital recording/playback apparatus according to claim 1, wherein the error correction coder further comprises:
- a first memory having a memory size to accommodate a predetermined data format to be used during outer error correction coding; and
- a second memory having a memory size to accommodate at least one sync block to be used during inner error correction coding.

3. The digital recording/playback apparatus according to claim 2, wherein each byte of the predetermined pattern data is a predetermined number.

4. The digital recording/playback apparatus according to claim 3, wherein each number in the predetermined pattern data is the same as the other numbers in the predetermined pattern.

5. The digital recording/playback apparatus according to claim 4, wherein the predetermined pattern data corresponds to arithmetic zero.

6. A digital recording/playback apparatus for recording normal play data and trick play data separately on a recording medium in a predetermined data format, and reproducing the data recorded on the recording medium, the apparatus comprising:

- an adding unit for adding extra information indicative of a decoding timing to a received transport stream and outputting the normal play data in units of a predetermined number of sync blocks;
- an extracting unit for extracting the trick play data from the received transport stream and outputting the trick play data in units of a predetermined number of sync blocks;
- an arranging unit for arranging the normal play data in a normal play data region, the trick play data in a trick play data region, and a predetermined pattern data in a stuffing region of the normal play data region according to a difference between a predetermined recording rate and a bit rate of the transport stream;
- an error correction coder for performing outer error correction on the normal play data, regardless of the trick play data and stuffing data among the arranged data, and outputting error-correction-coded data; and
- a modulator for modulating the error-correction-coded data and transmitting modulated data to the recording medium,
- wherein the error correction coder comprises:
  - an outer error correction coder for arranging the predetermined pattern data in the stuffing region and the trick play data region simultaneously, adding an outer parity to the normal play data, and outputting outer-error-correction-coded data of normal play data; and
  - an inner error correction coder for adding an inner parity to the outer-error-correction-coded data output from the outer error correction coder, and outputting inner-error-correction-coded data,
- wherein the outer error correction coder performs outer error correction coding by overwriting the predetermined pattern data in a separate error correction code region of the normal play data region, said separate error correction code region being provided as part of the normal play data region in addition to said stuffing region and trick play data region.

7. The digital recording/playback apparatus according to claim 6, wherein each byte of the predetermined pattern data is a predetermined number.

8. The digital recording/playback apparatus according to claim 7, wherein each number in the predetermined pattern data is the same as the other numbers in the predetermined pattern.

9. The digital recording/playback apparatus according to claim 8, wherein the predetermined pattern data corresponds to arithmetic zero.

10. A digital recording/playback apparatus for recording normal play data and trick play data separately on a recording medium in a predetermined data format, and reproducing the data recorded on the recording medium, the apparatus comprising:

- an adding unit for adding extra information indicative of a decoding timing to a received transport stream and outputting the normal play data in units of a predetermined number of sync blocks;
- an extracting unit for extracting the trick play data from the received transport stream and outputting the trick play data in units of a predetermined number of sync blocks;
- an arranging unit for arranging the normal play data in a normal play data region, the trick play data in a trick play data region, and a predetermined pattern data in a stuffing region of the normal play data region according to a difference between a predetermined recording rate and a bit rate of the transport stream;
- an error correction coder for performing outer error correction on the normal play data, regardless of the trick play data and stuffing data among the arranged data, and outputting error-correction-coded data; and
- a modulator for modulating the error-correction-coded data and transmitting modulated data to the recording medium, wherein the error correction coder comprises:
   an outer error correction coder for arranging the predetermined pattern data in the stuffing region and the trick play data region simultaneously, adding an outer parity to the normal play data, and outputting outer-error-correction-coded data of normal play data; and
   an inner error correction coder for adding an inner parity to the outer-error-correction-coded data output from the outer error correction coder, and outputting inner-error-correction-coded data, further comprising:
      a demodulator for demodulating the data recorded on the recording medium and outputting demodulated data;
      an error correction decoder for performing error-correction-decoding on the demodulated data; and
      a selector for selecting error-correction decoded normal play data during a normal play mode, and selecting error-correction decoded trick play data during a trick play mode, according to a normal/trick play mode signal, wherein the error correction decoder comprises:
         an inner error correction decoder for performing inner error correction decoding on the demodulated normal play data using the inner parity during a normal play mode and outputting inner-error-correction-decoded normal play data to the selector, and for performing inner error correction decoding on the demodulated trick play data using the inner parity during a trick play mode and outputting inner-error-correction-decoded trick play data to the selector; and
         an outer error correction decoder for arranging the predetermined pattern data used in the error correction coding in the stuffing region and the trick play data region, performing outer error correction decoding on the inner-error-correction-decoded normal play data using the outer parity, and outputting outer-error-correction-decoded data.

11. The digital recording/playback apparatus according to claim 10, wherein the outer error correction decoder performs outer error correction decoding by overwriting the predetermined pattern data in a separate error correction code region of the normal play data region, said separate error correction code region being provided as part of the normal play data region in addition to said stuffing region and trick play data region.

12. The digital recording/playback apparatus according to claim 10, wherein the error correction decoder further comprises:
   a first memory having a memory size to accommodate at least one sync block to be used during inner error correction decoding;
   an extra header analyzer for analyzing a sync block extra header added to the inner-error-correction-decoded data and outputting the analyzed information to the outer error correction decoder; and
   a second memory having a memory size to accommodate the predetermined data format to be used during outer error correction decoding.

13. The digital recording/playback apparatus according to claim 10, further comprising:
   a demultiplexer for outputting the outer-error-correction-decoded normal play data during the normal play mode and outputting a outer-error-correction-decoded trick play data during the trick play mode, according to a normal/trick play mode signal;
   a buffer for temporarily storing the outer-error-correction-decoded normal play data output from the demultiplexer;
   a restoration time controller for packetizing the normal play data read from the buffer into a transport packet, and outputting the normal play data based on a time stamp added to the transport packet;
   a RAM for writing and reading the inner-error-correction-decoded trick play data output through the demultiplexer; and
   a RAM controller for rearranging the trick play data after removing overlapping data and normal play data from the trick play data, writing rearranged trick play data to the RAM, transport-packetizing the trick play data in the RAM and outputting packetized trick play data to a second selector.

14. A method for recording normal play data and trick play data separately on a recording medium in a predetermined data format, and reproducing the data recorded on the recording medium, the method comprising the steps of:
   (a) adding extra information indicative of a decoding timing to a received transport stream and outputting a transport packet to which the extra information is added;
   (b) mapping a first predetermined number of transport packets, to which the extra information is added, in units of a second predetermined number of sync blocks and outputting the normal play data;
   (c) extracting trick play data from the received transport stream;
   (d) packetizing extracted trick play data, mapping the first predetermined number of transport packets of packetized trick play data in units of the second predetermined number of sync blocks and outputting the trick play data;
   (e) arranging the normal play data in a normal play data region, the trick play data in a trick play data region, and predetermined pattern stuffing data in a stuffing region of the normal play data region according to a difference between a predetermined recording rate and a bit rate of the transport stream;
   (f) performing outer error correction on the normal play data, regardless of the trick play data and stuffing data among the arranged data, and outputting error-correction-coded data; and
   wherein the step (f) comprises the steps of:
      (f1) arranging a predetermined pattern data in the stuffing region and the trick play data region simultaneously, adding an outer parity to the normal play data, and outputting outer-error-correction-coded data for the normal play data;
      (f2) adding an inner parity to the outer-error-correction-coded data, and outputting inner-error-correction-coded data, and
   (g) modulating the error-correction-coded data and transmitting modulated data to the recording medium.

15. The method according to 14, wherein each byte of the predetermined pattern data is a predetermined number.

16. The method according to claim 15, wherein each number in the predetermined pattern data is the same as the other numbers in the predetermined pattern.

17. The method according to claim 16, wherein the predetermined pattern data corresponds to arithmetic zero.

18. The method according to claim 14, further comprising the steps of:
- (h) demodulating the data recorded on the recording medium and outputting demodulated data;
- (i) performing error-correction-decoding on the demodulated data; and
- (j) selecting error-correction decoded normal play data during a normal play mode, and selecting error-correction decoded trick play data during a trick play mode, according to a normal/trick play mode signal, wherein the step (i) comprises the steps of:
- (i1) performing inner error correction decoding on the demodulated normal play data using the inner parity during the normal play mode and outputting inner-error-correction-decoded normal play data, and performing inner error correction decoding on the demodulated trick play data using the inner parity during the trick play mode and outputting inner-error-correction-decoded trick play data; and
- (i2) arranging the predetermined pattern data used in the error correction coding in the stuffing region and the trick play data region, performing outer error correction decoding on the inner-error-correction-decoded normal play data using the outer parity, and outputting outer-error-correction-decoded data.

19. The method according to claim 18, wherein in the step (i2), outer error correction decoding is performed by overwriting the predetermined pattern data used during the error correction coding in a separate error correction code region of the normal play data region, said separate error correction code region being provided as part of the normal play data region in addition to said stuffing region and trick play data region.

20. A method for recording normal play data and trick play data separately on a recording medium in a predetermined data format, and reproducing the data recorded on the recording medium, the method comprising the steps of:
- (a) adding extra information indicative of a decoding timing to a received transport stream and outputting a transport packet to which the extra information is added;
- (b) mapping a first predetermined number of transport packets, to which the extra information is added, in units of a second predetermined number of sync blocks and outputting the normal play data;
- (c) extracting trick play data from the received transport stream;
- (d) packetizing extracted trick play data, mapping the first predetermined number of transport packets of packetized trick play data in units of the second predetermined number of sync blocks and outputting the trick play data;
- (e) arranging the normal play data in a normal play data region, the trick play data in a trick play data region, and predetermined pattern stuffing data in a stuffing region of the normal play data region according to a difference between a predetermined recording rate and a bit rate of the transport stream;
- (f) performing outer error correction on the normal play data, regardless of the trick play data and stuffing data among the arranged data, and outputting error-correction-coded data; and wherein the step (f) comprises the steps of:
- (f1) arranging a predetermined pattern data in the stuffing region and the trick play data region simultaneously, adding an outer parity to the normal play data, and outputting outer-error-correction-coded data for the normal play data; and
- (f2) adding an inner parity to the outer-error-correction-coded data, and outputting inner-error-correction-coded data, wherein in the step (f1), outer error correction coding is performed by overwriting the predetermined pattern data in a separate error correction code region of the normal play data region, said separate error correction code region being provided as part of said normal play data region in addition to said stuffing region and trick play data region, and

- (g) modulating the error-correction-coded data and transmitting modulated data to the recording medium.

21. The method according to claim 20, wherein each byte of the predetermined pattern data is a predetermined number.

22. The method according to claim 21, wherein each number in the predetermined pattern data is the same as the other numbers in the predetermined pattern.

23. The method according to claim 22, wherein the predetermined pattern data corresponds to arithmetic zero.

* * * * *